(12) United States Patent
Temerinac et al.

(10) Patent No.: US 7,593,065 B2
(45) Date of Patent: Sep. 22, 2009

(54) METHOD AND CIRCUIT FOR CHANNEL FILTERING OF ANALOG OR DIGITALLY MODULATED TV SIGNALS

(75) Inventors: Miodrag Temerinac, Gundelfingen (DE); Hans Fiesel, Denzlingen (DE)

(73) Assignee: Micronas GmbH, Freiburg (DE)

( * ) Notice: Subject to any disclaimer, the term of this patent is extended or adjusted under 35 U.S.C. 154(b) by 637 days.

(21) Appl. No.: 11/274,901

(22) Filed: Nov. 14, 2005

(65) Prior Publication Data
US 2006/0103766 A1 May 18, 2006

(30) Foreign Application Priority Data
Nov. 12, 2004 (DE) .................. 10 2004 054 893

(51) Int. Cl.
H04N 5/21 (2006.01)
H04N 5/455 (2006.01)
(52) U.S. Cl. ....................... 348/607; 348/726
(58) Field of Classification Search ................ 348/606, 348/607, 624, 725–728, 731–733, 21; 375/235, 375/316, 321, 324, 326, 346, 350; H04N 5/21, H04N 5/44, 5/455, 5/50
See application file for complete search history.

(56) References Cited

U.S. PATENT DOCUMENTS

| | | | |
|---|---|---|---|
| 4,484,194 A | 11/1984 | Arvidsson | |
| 4,608,703 A | 8/1986 | Kaga et al. | |
| 4,729,110 A | 3/1988 | Welles, II et al. | |
| 4,871,975 A | 10/1989 | Nawata et al. | |
| 4,977,580 A | 12/1990 | McNicol | |
| 5,148,451 A | 9/1992 | Otani et al. | |

(Continued)

FOREIGN PATENT DOCUMENTS

DE 197 39 645 3/1999 ............. 7/27

(Continued)

OTHER PUBLICATIONS

J. Ammer et al., "Timing Recovery Unit for a 1.6 Mbps DSSS Receiver," [Online] Dec. 12, 2000, pp. 1-28, XP-002448107, University of Berkeley, USA, URL: http://bwrc.eecs.berkeley.edu/People/Grad_Students/msheets/ee225c/EE225c_final_ammer_sheets.pdf.

(Continued)

Primary Examiner—Sherrie Hsia
(74) Attorney, Agent, or Firm—O'Shea Getz P.C.

(57) ABSTRACT

In order to suppress interference signals from adjacent TV channels, an intermediate frequency signal is demodulated with a signal ($S(f_{BT}; 0°)$) at a video carrier frequency into an in-phase signal, and with a signal ($S(f_{BT}; 90°)$) shifted in phase by a phase angle $\pi/2$ relative to the signal ($S(f_{BT}; 0°)$) and at a video carrier frequency into a quadrature signal, for example, by an I/Q demodulator. The in-phase signal is filtered by a first Hilbert filter of a Hilbert filter pair having an even symmetrical impulse response in order to obtain a Hilbert-filtered in-phase signal. The quadrature signal is filtered by a second Hilbert filter of the Hubert filter pair having an uneven symmetrical impulse response in order to obtain a Hilbert-filtered quadrature signal. The Hilbert-filtered quadrature signal is added, for example, by an adder to the Hilbert-filtered in-phase signal in order to obtain a video output signal.

36 Claims, 7 Drawing Sheets

U.S. PATENT DOCUMENTS

| | | |
|---|---|---|
| 5,604,768 A | 2/1997 | Fulton |
| 5,825,242 A | 10/1998 | Prodan et al. |
| 6,075,409 A | 6/2000 | Khlat |
| 6,184,921 B1 | 2/2001 | Limberg .......................... 5/38 |
| 6,233,295 B1 * | 5/2001 | Wang ......................... 348/726 |
| 6,559,899 B1 * | 5/2003 | Suzuki et al. .............. 348/731 |
| 2002/0097812 A1 | 7/2002 | Wiss |
| 2003/0203728 A1 | 10/2003 | Filipovic |
| 2004/0081257 A1 | 4/2004 | Lin et al. ......................... 1/24 |

FOREIGN PATENT DOCUMENTS

| | | | |
|---|---|---|---|
| EP | 0963110 | 12/1999 | .................... 5/455 |
| EP | 1 487 166 | 12/2004 | ................. 27/227 |
| WO | WO 01/05025 | 1/2001 | |

OTHER PUBLICATIONS

W. Gao et al., "All-Digital Reverse Modulation Architecture Based Carrier Recovery Implementation for GMSK and Compatible FQPSK," IEEE Transactions on Broadcasting, vol. 42, No. 1, Mar. 1996, pp. 55-62, XP01106019.

* cited by examiner

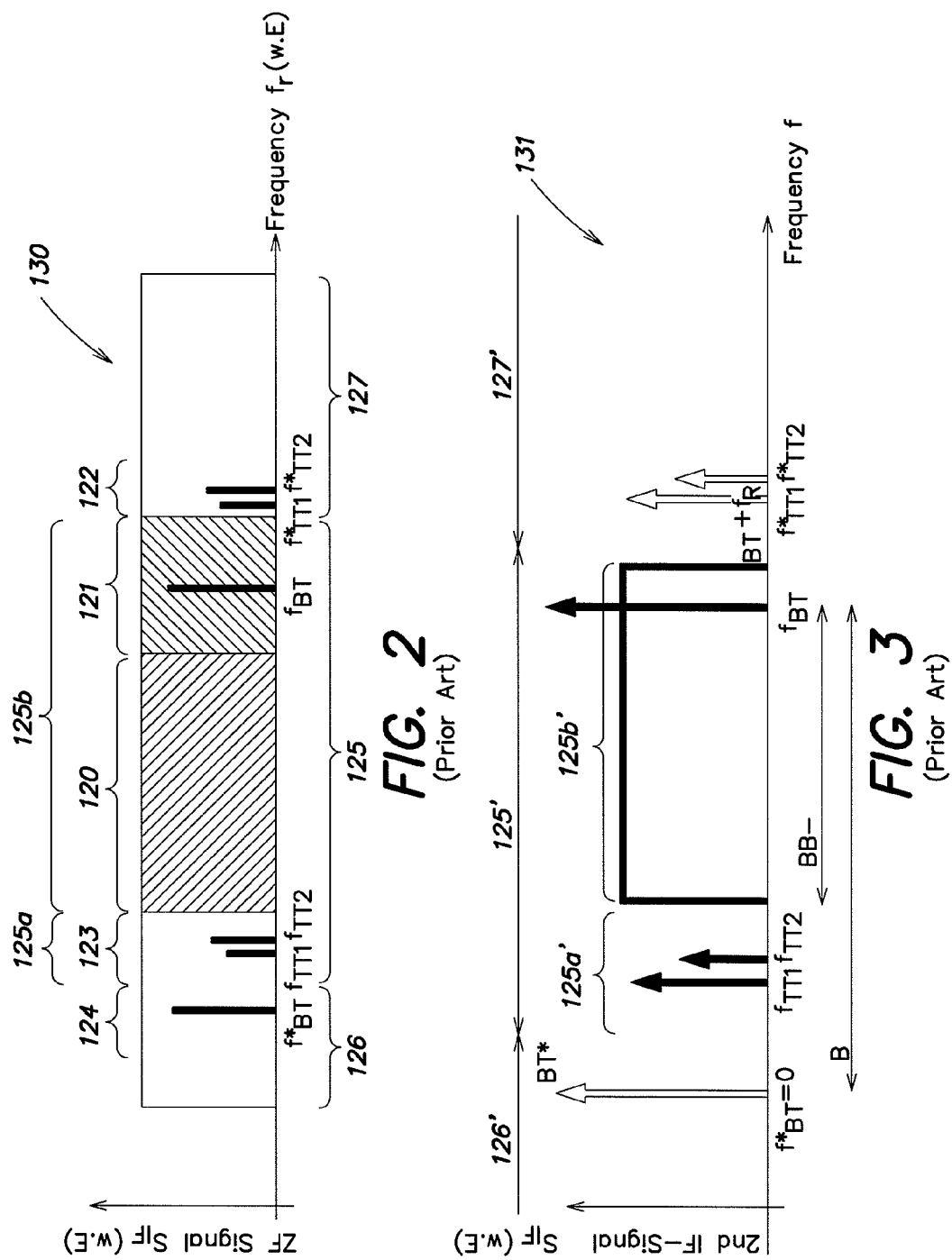

METHOD AND CIRCUIT FOR CHANNEL FILTERING OF ANALOG OR DIGITALLY MODULATED TV SIGNALS

PRIORITY INFORMATION

This patent application claims priority from German patent application 10 2004 054 893.5 filed Nov. 12, 2004, which is hereby incorporated by reference.

BACKGROUND OF THE INVENTION

The invention relates to the field of signal processing of received television signals, and in particular to channel filtering of analog or digitally modulated television signals.

Television signals are transmitted on various frequency channels. A tuner in a television receiver selects a channel based on the setting provided by the operator, then amplifies this channel. In most television receivers, the selected television signal is subsequently converted to a first intermediate frequency (IF) of about 40 MHz. The intermediate frequency signal is typically bandpass filtered by a surface wave filter. In many implementations of television receivers, the TV signal converted to the first intermediate frequency is then converted to a second intermediate frequency after subsequent, generally analog, signal processing. Such a conversion is described, for example, in DE 198 25 455 C2. For purposes of clear differentiation, this second intermediate frequency will be abbreviated to $2^{nd}$ IF. The second intermediate frequency, $2^{nd}$ IF, is selected such that the video carrier of the lower side channel is set at zero frequency. As a result, the side channel video carrier can be easily filtered out by an analog high-pass filter. Since unwanted mixing products of the second conversion must also be suppressed, and subsequent analog-to-digital conversion requires an anti-aliasing low-pass filter, this filter is also designed as a bandpass filter. The resultant signal, also called the $2^{nd}$ IF signal, is then fed to another, preferably digital, signal processor.

Modem tuner units, so-called silicon tuners, are also able to convert the channel directly to the low IF, or use as the IF a significantly higher frequency (e.g., 1.2 GHz), and then convert to the low IF.

A multiplicity of prior art techniques effect channel filtering of an analog or digitally modulated TV signal of a channel (selected from a tuner) having a video carrier signal converted to an intermediate frequency (IF or $2^{nd}$ IF), video signal(s), generally two sound carrier signals, and sound signal(s). Although these techniques have in principle proven successful, they all require special transmission-standard-dependent prefilters. Otherwise, generally not all interfering signals from adjacent channels—specifically, higher or lower side channels—are effectively suppressed or filtered out if only one prefilter is to be used. In addition, with these methods the prefilters have completely different amplitude responses relative to the prefilters required for digital television signals.

There is a need for improved channel filtering of analog or digitally modulated TV signals converted to an intermediate frequency, which suppresses interference more effectively, and uses the same standard-independent prefiltering for analog and digitally modulated television signals.

SUMMARY OF THE INVENTION

An analog or digitally modulated TV signal comprises a video signal, a sound signal, and video carrier signal with a video carrier frequency. The TV signal is converted to an intermediate frequency forming an intermediate frequency signal. To suppress interference signals of adjacent TV channels, and to separate video and sound information, the intermediate frequency signal is demodulated with a signal having the video carrier frequency into an in-phase signal, and is demodulated with a signal, having the video carrier frequency and shifted in phase by a phase angle of $\pi/2$ relative to the signal, into a quadrature signal—for example, by a so-called I/Q demodulator. The in-phase signal is filtered by a first Hilbert filter of a Hilbert filter pair and having an even symmetrical impulse response in order to obtain a Hilbert-filtered in-phase signal. The quadrature signal is filtered by a second Hilbert filter of the Hilbert filter pair having an uneven symmetrical impulse response in order to obtain a Hilbert-filtered quadrature signal. The Hilbert-filtered quadrature signal is added to the Hilbert-filtered in-phase signal in order to obtain a video output signal. The Hilbert-filtered quadrature signal is subtracted from the Hilbert-filtered in-phase signal to obtain a sound output signal. Splitting of the video signal from the sound signal is combined with the filtering to achieve improved filtering in the respective split frequency ranges for video and sound.

The system of the present invention may filter a TV signal that has been converted to any given intermediate frequency. In addition, it is fundamentally irrelevant whether the filtering is implemented by analog technology or digitally, although digital filtering often has advantages in terms of realizing the desired filter characteristic.

In the case of digital filtering, it is particularly advantageous if the intermediate frequency signal subject to the above-described I/Q demodulation, Hilbert filtering, and subsequent summation or subtraction is generated by converting a video carrier from a lower side channel to zero frequency since this produces the lowest possible signal frequencies, and as a result, the digital processing can be implemented as slowly as possible. Expressed differently, this means when the above-indicated $2^{nd}$ IF signal or low, IF signal is split into a video signal and/or sound signal.

In order to obtain on the input side an essentially interference-free intermediate frequency signal (in particular, $2^{nd}$ IF signal), and in order to keep away as many interference signals as possible from the critical analog-to-digital conversion, the system may include bandpass filtering of the intermediate frequency signal before the I/Q demodulation. A system according to the invention may include one or more bandpass filters on the input side of the I/Q demodulator.

Although in principle one filter may be provided for each transmission standard to suppress unwanted interference/signals, it has proven more useful if the bandpass filtering suppresses at least and primarily residual interference from the lower side channel. Any residual interferences remaining from the upper sideband after bandpass filtering can be tolerated up to a certain level. This approach has the advantage that a comparatively simple (and thus inexpensive) filtering provides good results.

Since the lower adjacent video carrier may be converted to frequency zero, even lower-frequency components can be folded back into the useful band (image frequency of conversion). Therefore, a system according to the present invention should contain a device that prevents this. Bandpass filtering before the conversion, or of a complex conversion, may be included in order to suppress the image frequency of conversion. It is especially useful if this arrangement also suppresses the video carrier of the lower side channel. An analog high-pass filter may be included after conversion to the $2^{nd}$ IF, the cut-off frequency of this filter being above the video carrier of the lower side channel and below the useful channel.

A digital bandpass filter may be provided such that it has a passband that extends between a frequency greater than the frequency to which the video carrier of the lower side channel has been converted (frequency zero in the case of the $2^{nd}$ IF signal) and a frequency smaller than half the sampling frequency.

To provide additional interference signal suppression, the in-phase signal and/or quadrature signal may be low-pass-filtered prior to Hilbert filtering. The low-pass filters may be configured such that by low-pass-filtering the in-phase signal and/or low-pass-filtering the quadrature signal, unwanted mixing products are suppressed around the second harmonic of the video carrier from the I/Q demodulation.

It has proven to be advantageous if the low-pass filter(s) for the in-phase signal or quadrature signal has (have) a transfer function with a passband that extends up to a frequency corresponding to a channel bandwidth of the TV signal (which, for example, for the PAL standard is around 7 or 8 MHz, and for the NTSC standard is around 6 MHz).

Since the mixing products are located within a frequency distance, corresponding to the channel width, from the frequency of the second harmonic of the video carrier frequency (corresponding to double the video carrier frequency), in an especially advantageous embodiment of the invention one or both of the low-pass filters for the in-phase signal or quadrature signal have a zero value at a frequency that corresponds to double the video carrier frequency minus the channel bandwidth.

The Hilbert filters of the Hilbert filter pair may be configured such that interference products from an upper side channel are suppressed by the Hilbert filtering. Alternatively or in addition, during Hilbert filtering the phase relationship, in particular, the sign, of video and sound signal components in the in-phase signal and the quadrature signal, are synchronized such that the separation into the video output signal and into the sound output signal results from the sum of the Hilbert-filtered in-phase signal or quadrature signal, or from the difference taken between the in-phase signal and the Hilbert-filtered quadrature signal.

The transfer function of the Hilbert filter may have a passband, for example, for the in-phase signal, which extends up to an upper frequency that approximately corresponds to the channel bandwidth. Similarly, the transfer function of the Hilbert filter may have a passband for the quadrature signal that extends up to an upper frequency that approximately corresponds to the channel bandwidth.

The Hilbert filter for the quadrature signal also has, for example, a transfer function with a passband that extends up to a lower frequency corresponding to the vestigial sideband width. Vestigial sideband width is the width of the sideband which is partially suppressed during transmission of the television signal. Within the vestigial sideband, no useful signal is produced within the Q branch since the upper and lower sidebands cancel each other out.

The Hilbert filter for the quadrature signal may be configured so that it has a transfer function between a frequency that corresponds to a bandwidth of the video signal (e.g., the bandwidth of the signal is 5 MHz according to the PAL standard, and 4.2 MHz according to the NTSC standard) and a frequency that corresponds to a channel bandwidth (see above: 7 or 8 MHz according to the PAL standard and 6 MHz according to the NTSC standard), which transfer function has exactly the reverse sign relative to the transfer function between the above-indicated residual frequency and a frequency that corresponds to the bandwidth of the video signal.

In order to suppress the above-mentioned interference signals, the transfer function of the Hilbert filter of the Hilbert filter pair preferably also has the same zero values as the above-described low-pass filters that are optionally on the input side of the Hilbert filters. In particular, for example, the transfer function of the Hilbert filter for the in-phase signal has a zero value at a frequency that corresponds to double the video carrier frequency minus the channel bandwidth. The Hilbert filter for the quadrature signal also has, in a preferred embodiment, alternatively or in addition, a zero value at a frequency that corresponds to double the video carrier frequency minus the channel bandwidth. To separate the video signal and sound signal, the Hilbert filter for the quadrature signal may include a transfer function that corresponds to a bandwidth of the video signal.

Although substantially interference-free output signals for sound and video are generated by the above-indicated filter arrangements or methods, the sound output signal can still contain residual disturbance signals. These can be suppressed if the sound output signal obtained by subtracting the Hilbert-filtered quadrature signal from the Hilbert-filtered in-phase signal using a high-pass filter following the subtractor is once again high-pass-filtered so as to obtain a filtered sound output signal.

In particular, the high-pass filter is preferably designed to suppress by high-pass filtering the residual interference (in particular, sound signal interference) from an upper side channel.

These and other objects, features and advantages of the present invention will become more apparent in light of the following detailed description of preferred embodiments thereof, as illustrated in the accompanying drawings.

BRIEF DESCRIPTION OF THE DRAWINGS

FIG. 2 illustrates a spectrum of an IF signal (prior art) converted to a first intermediate frequency;

FIG. 3 illustrates a spectrum of a $2^{nd}$ IF signal (prior art) converted to a second intermediate frequency ($2^{nd}$ IF, zero IF);

DETAILED DESCRIPTION OF THE INVENTION

Figure 1:
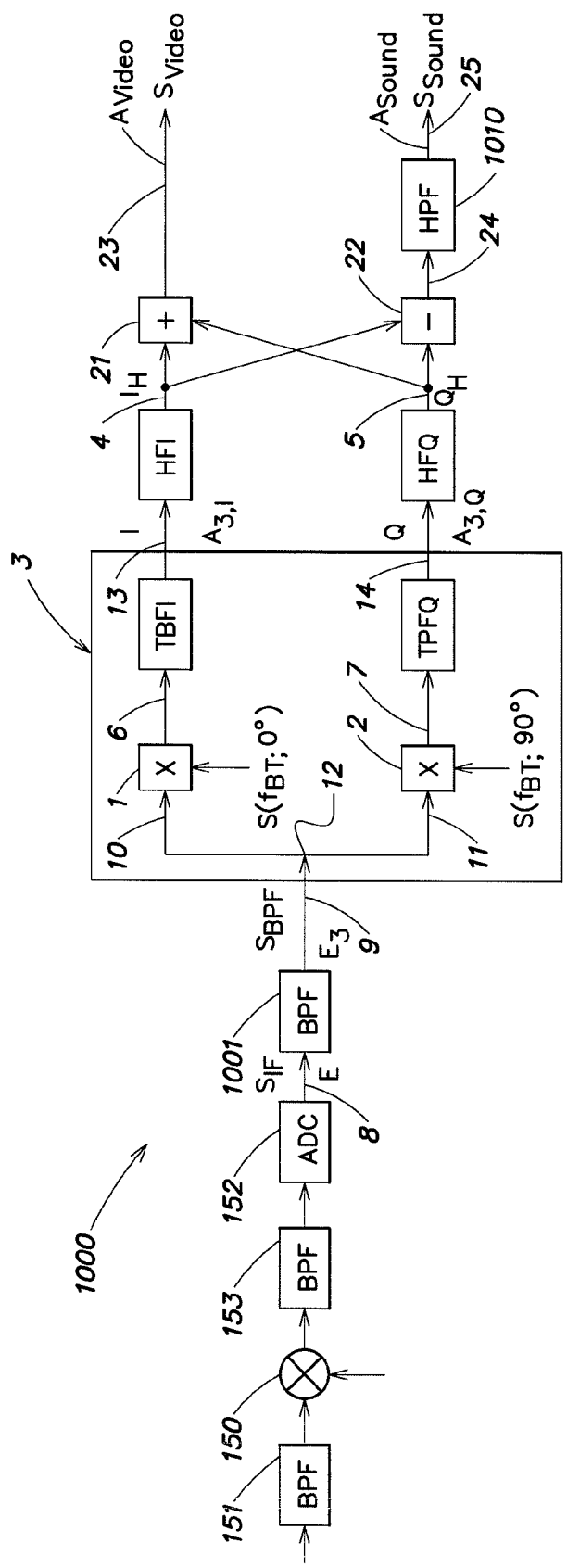
FIG. 1 is a block diagram illustration of a system for channel-filtering of analog or digitally modulated TV signals.

The starting point of the following considerations is a spectrum of a TV signal that has been selected from a tuner as specified by the operator, subsequently amplified, then converted to a first intermediate frequency. A frequency spectrum 130 of this type is shown in FIG. 2. FIG. 2 is a plot of the amplitude of the IF signal $s_{ZF}$ as a function of the frequency f.

Essentially, three characteristic frequency ranges are found in the figure which are identified by reference numbers 125-127. The frequency range identified by reference number 125 represents the useful signal channel for the video and sound of the selected channel.

The useful signal channel 125 has (as do the lower and upper side channels) two characteristic subranges, specifically, a subrange for low frequencies, the so-called sound signal range 125a, and the subrange for higher frequencies, the so-called video signal range 125b. The spectral lines of the first and second sound carriers for the two sound carrier frequencies $f_{TT1}$ and $f_{TT2}$ are plotted within the sound signal range 125a. This range is generally identified as an intrinsic sound carrier range 123.

The video signal range 125b comprises the double-sideband range of the video amplitude modulation 121 with the video carrier BT shown in FIG. 2 at video carrier frequency $f_{BT}$, and the single-sideband range 120.

Since the side channels have essentially the same subranges, the corresponding signal lines in FIG. 2 are also plotted for the sound carrier TT* of the upper side channel 127 at the sound carrier frequencies $f_{TT1}$* und $f_{TT2}$*, as is the spectral line of the video carrier BT* of the lower side channel 126 at a frequency $f_{BT}$*.

For the sake of completeness, the adjacent sound carrier range of the upper side channel 127 and the adjacent video carrier range of the lower channel 126 are identified by reference numbers 122 and 124 in FIG. 2.

As already described above, the IF signal spectrum is converted to a second IF signal $s_{IF}$. The $2^{nd}$ IF signal $s_{IF}$ is characterized by the fact that the video carrier BT* of the lower side channel 126 is now at zero frequency: f*$_{BT}$=0. The total $2^{nd}$ IF signal spectrum, that is, the $2^{nd}$ IF signal $s_{IF}$ plotted as a function of the frequency f, is shown in FIG. 3 and identified by reference number 131. To simplify orientation, the actual useful signal channel, as well as the lower and upper side channels, are identified by primed reference symbols 125', 126', and 127'.

Also plotted are the spectral lines, indicated above as characteristic, for the video carrier BT* of the lower side channel 126 at a frequency f*$_{BT}$=0, the two intrinsic sound carriers TT at frequencies $f_{TT1}$ and $f_{TT2}$, the intrinsic video carrier BT at a frequency $f_{BT}$, and the two sound carriers TT$_1$*, TT$_2$* of upper side channel 127' at frequencies f*$_{TT1}$ or f*$_{TT2}$.

The channel width B is determined by the distance between the adjacent video carriers BT, BT*. The bandwidth of video signal BB is determined by the transmission standard.

As explained above, prior art signal processing of the television signal selected by the tuner is subject to too much interference to provide television reception of optimum video and sound quality. The problems include residual interference BT*, TT* from the lower and upper side channels 126, 127 that need to be suppressed. In addition, the video and sound signals that are synchronously demodulated with the video carrier BT at a video carrier frequency $f_{BT}$ need to be outputted separately.

FIG. 1 illustrates a circuit 1000 for effect channel filtering of analog or digitally modulated TV signals. The circuit 1000 comprises a prefilter such as a bandpass filter (BPF) 1001, an I/Q demodulator 3, a Hilbert filter pair with individual filters HF-I, HF-Q, an arithmetic unit in the form of an adder 21 and a subtractor 22 to separate the video and sound signals, and a post-filter in the form of a high-pass filter HPF 1010.

The circuit for conversion to the $2^{nd}$ IF frequency and corresponding prefilter are also illustrated. In particular, a multiplier 150 is shown which generates conversion to the $2^{nd}$ IF. Connected on the input side of multiplier 150 is a bandpass filter 151 which suppresses the image frequency of the conversion. In addition, a bandpass filter 153 and an analog-to-digital converter (ADC) 152 are connected on the output side of multiplier 150.

The bandpass filter 153 functions as an anti-aliasing filter that suppresses the video carrier of the lower side channel prior to the analog-to-digital conversion. In addition, another high-pass filter not shown can be provided that filters out the video carrier of the lower side channel in order to simplify analog-to-digital conversion.

Figure 6:
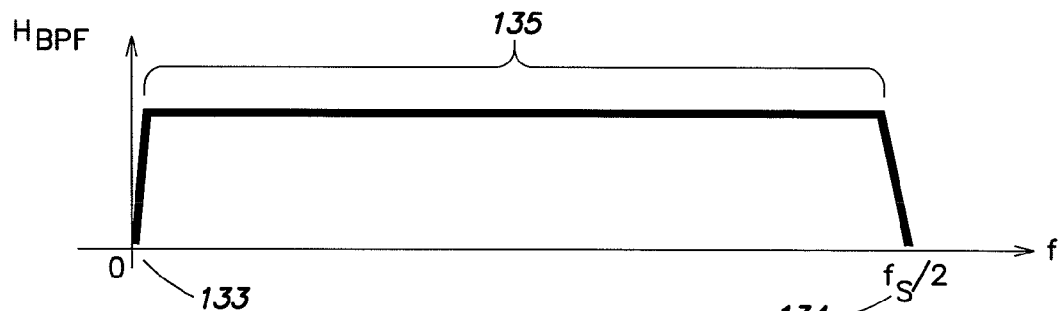
FIG. 6 illustrates a transfer function of the digital bandpass filter, connected on the input side of the I/Q demodulator, from the circuit of FIG. 1.

The bandpass filter BPF 1001 (which can comprise multiple analog and/or digital filters) with the filter characteristic shown in FIG. 6 receives the intermediate frequency signal on a line 8. The output of the bandpass filter 1001 is provided on a line 9 to the I/Q demodulator 3.

Referring to FIG. 6, the bandpass filter BPF 1001, which in this embodiment is digital, has a passband 135 that extends between a frequency f greater than a frequency 133 ($f_{BT}$=0) to which the video carrier BT* of the lower side channel 126' has been converted, and a frequency 134 less than half the sampling frequency $f_{s/2\ ist}$. In addition, the bandpass filter BPF 1001 (FIG. 1) has a zero value 133 at frequency $f_{BT}$*=0 to which the video carrier BT* of the lower side channel 126 has been converted, and a zero value 134 at half the sampling frequency $f_s/2$.

Figure 7:
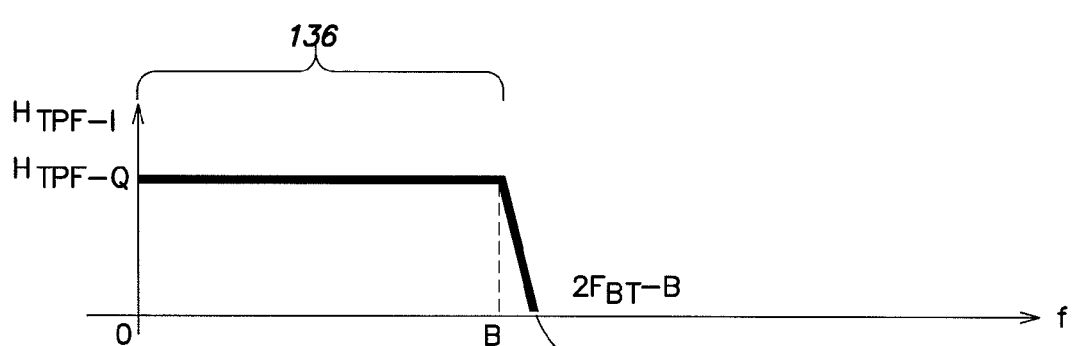
FIG. 7 illustrates plots of a transfer function of the low-pass filters, connected on the input side of the Hilbert filter pair, from the circuit of FIG. 1, where the low-pass filters attenuate the unwanted mixing products generated during the I/Q demodulation around the second harmonic of the video carrier.

Referring again to FIG. 1, in the I/Q demodulator 3, an input signal on the line 9 is input to a first mixer 1 and a second mixer 2. The first mixer 1 provides an in-phase signal on a line 6 to a first low-pass filter TPF-I. FIG. 7 illustrates a plot of the characteristic of the low pass filter TPF-I. The second mixer 2 provides a quadrature signal output on a line 7 to a second low-pass filter TPF-Q which also has a filter characteristic as shown in FIG. 7.

Referring to FIG. 7, the low-pass filters TPF-I, TPF-Q have the same filter characteristic. The low-pass filter TPF-I for the in-phase signal I and the low-pass filter TPF-Q for the quadrature signal Q have a zero value 139 at a frequency f=2$f_{BT}$−B, which corresponds to double the video carrier frequency 2$f_{BT}$ minus the channel bandwidth B. Passband 136 extends from a frequency f=0 up to a frequency f=B that corresponds to a channel bandwidth B of the TV signal.

The first low-pass filter TPF-I provides a filtered output signal on line 13 to a first Hilbert filter HF-I. The second low-pass filter TPF-Q provides an output signal on line 14 to a second Hilbert filter HF-Q. The filter characteristics of the Hilbert filters HF-I and HF-Q are illustrated in FIGS. 8A and 8B, respectively.

Figure 8A:
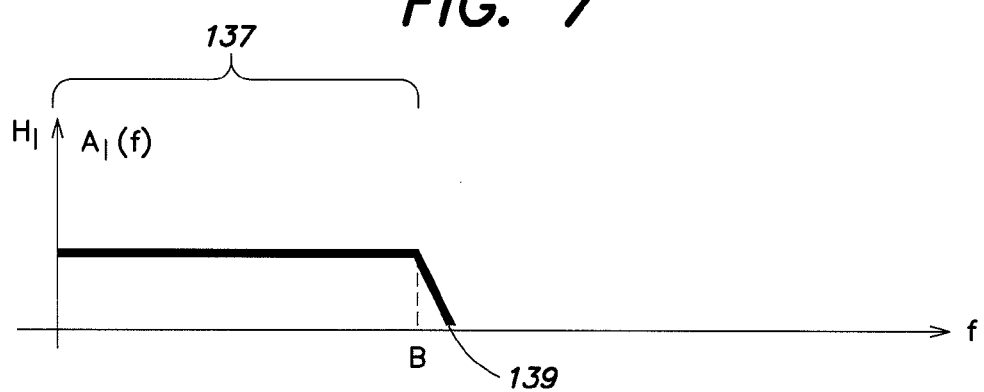
FIGS. 8A and 8B illustrate plots of transfer functions for the Hilbert filter pair of the circuit of FIG. 1, where the Hilbert filter pair attenuate disturbance products from the upper side channel, and correctly to set the sign of the video and sound signals for the separation.

Referring to FIG. 8A, the Hilbert filter HF-I has a passband 137 that extends from zero frequency f=0 up to an upper frequency f=B corresponding to the channel bandwidth B. The Hilbert filter HF-I for the in-phase signal I has a zero value 139 at a frequency f=2$f_{BT}$–B that corresponds to double the video carrier frequency 2$f_{BT}$ minus the channel bandwidth. Referring to FIG. 8B, the Hilbert filter HF-Q for the quadrature signal Q has a passband 138a, 138b that extends by an additional frequency f=$f_R$ corresponding to the residual frequency $f_R$ up to an upper frequency f=B that corresponds to the channel bandwidth B.

Figure 8B:
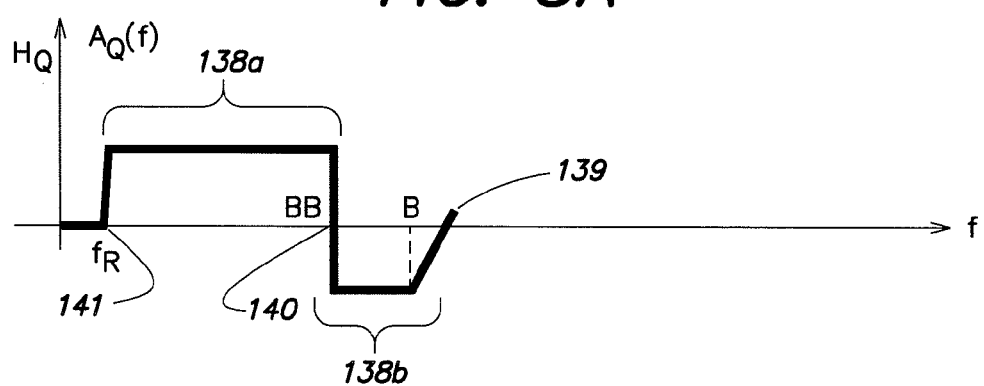

Referring to FIG. 8B, while the transfer function $H_Q$=$A_Q$ between residual frequency $f_R$ and a frequency corresponding to a bandwidth BB of the video signal has positive sign, the transfer function in the remaining passband 138b is inverted. The Hilbert filter HF_Q for the quadrature signal Q has a zero value 139 at a frequency f=2$f_{BT}$–B that corresponds to double the video carrier frequency 2$f_{BT}$ minus channel bandwidth B and has a zero value 139 at a frequency f=BB corresponding to a bandwidth BB of the video signal.

Referring again to FIG. 1, the first Hilbert filter HF-I provides an in-phase output signal on line 4. Similarly, the second Hilbert filter HF-Q provides an output signal on line 5. An adder 21 sums the signals on the lines 4 and 5, and provides a video output signal on line 23 to a video output $A_{Video}$.

Figure 16:
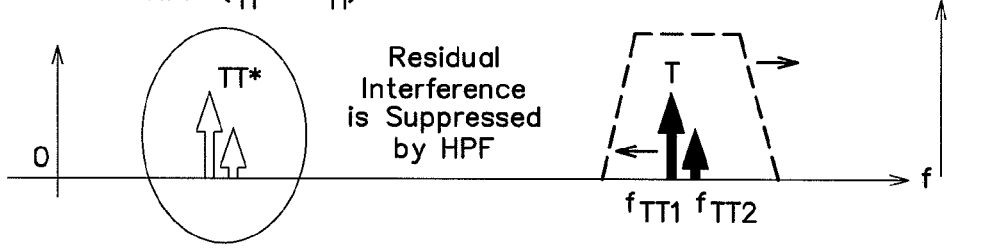
FIG. 16 illustrates the spectrum of the sound output signal after high-pass filtering to attenuate residual interference of the sound signals from the upper side channel is suppressed.

Subtractor 22 computes the difference between the signals on the lines 4 and 5 and provides a sound signal output on a line 24 to a high-pass filter 1010 having the filter characteristic illustrated in FIG. 16. The high-pass filter 1010 provides a sound output signal on line 25 to a sound output $A_{Sound}$.

To enhance understanding of the circuit, the following explains the functionalities of the I/Q demodulator 3 and the Hilbert filter pair with Hilbert filters HF-I and HF-Q on the basis of simple frequency spectra.

I/Q Demodulator

It is assumed that a cosinusoidal input signal is input on the line 9 to the I/Q demodulator 3 and the signal is processed along in-phase and quadrature signal paths, which provide outputs $A_{3,I}$ or $A_{3,Q}$, respectively.

Each component of a modulated input signal that can be described by the following equation as a function of time t:

$$s_{IF}(t)=A \cdot \cos(2\pi(f_{BT}+f)t)$$

with amplitude A and on frequency f+$f_{BT}$ is shifted in frequency in the I/Q demodulator 3, is split with a rotation to the I and Q outputs, and is multiplied according to the position relative to carrier frequency $f_{BT}$ with plus or minus signs, and is low-pass-filtered with filter characteristics $H_{TPF-I}$, $H_{TPF-Q}$ according to the following equations:

$$I(t) = H_{TPF-I}\{s_{IF}(t) \cdot \cos(2\pi f_{BT}t)\} = +\frac{1}{2}A \cdot \cos(2\pi ft)$$

$$Q(t) = H_{TPF-Q}\{s_{IF}(t) \cdot \sin(2\pi f_{BT}t)\} = -\frac{1}{2}A \cdot \sin(2\pi ft)$$

Figure 4A:
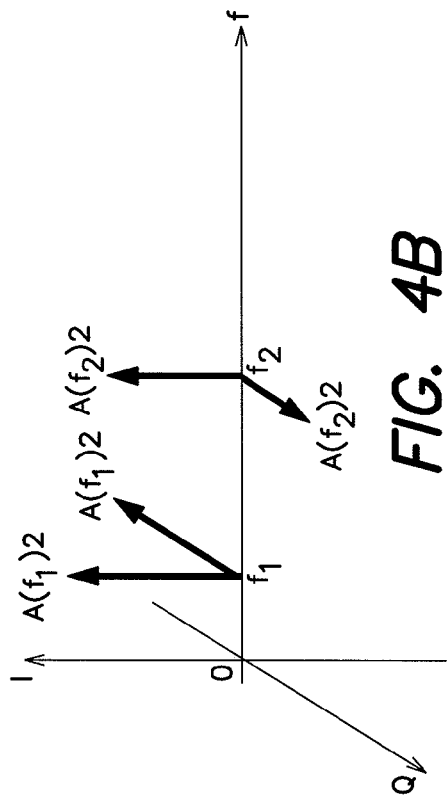
FIGS. 4A and 4B show an I/Q demodulation of the spectral lines, selected as an example, of a $2^{nd}$ IF signal, a) $2^{nd}$ IF input signal, b) I and Q components of the $2^{nd}$ IF signal after I/Q demodulation.
Figure 4B:
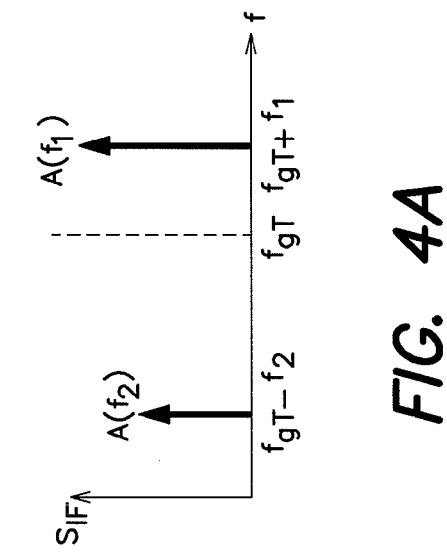

FIGS. 4A and 4B show an example of the spectral lines of an input signal $s_{IF}$ at frequency $f_2$ which is smaller than video carrier frequency $f_{BT}$ of video carrier BT, and of an input signal $s_{IF}$ at a frequency $f_1$ which is greater than video carrier frequency $f_{BT}$ (FIG. 4a)), as well as their conversion to corresponding in-phase components I and quadrature components Q (FIG. 4b)).

Hilbert Filter Pair

A Hilbert filter pair contains two filters HF-I and HF-Q with the following properties in the frequency range:

1. Both filters have a linear phase transition; and;
2. The phase transitions of the two filters HF-I, HF-Q differ by 90°.

In a digital implementation of the Hilbert filter pair, the even-symmetrical impulse response of the I-filter can be described by the equation:

$$h_I(L-n)=h_I(n)$$

while the uneven-symmetrical impulse response can described by the equation:

$$h_Q(L-n)=-h_Q(n)$$

where L is the filter length (in sampling values) and n is the number of the given filter section.

The transfer functions $H_I$, $H_Q$ of the Hilbert filter HF-I sampling at the sampling frequency fs, and of the Hilbert filter HF-Q sampling at sampling frequency $f_s$ in the frequency range are produced by the following equations:

$$H_I(f) = \sum_{n=0}^{L} h_I(n) \cdot e^{-2j\pi \frac{f}{f_s}n} = e^{-j\pi \frac{fL}{f_s}} \cdot A_I(f), \text{ where}$$

$$A_I(f) = \sum_{n=0}^{L} h_I(n) \cdot \cos\left(\pi \frac{f}{f_s}(L-2n)\right)$$

$$H_Q(f) = \sum_{n=0}^{L} h_Q(n) \cdot e^{-2j\pi \frac{f}{f_s}n} = e^{j\frac{\pi}{2}j\pi\frac{fL}{f_s}} \cdot A_Q(f), \text{ where}$$

$$A_Q(f) = \sum_{n=0}^{L} h_Q(n) \cdot \sin\left(\pi \frac{f}{f_s}(L-2n)\right)$$

Figure 5A:
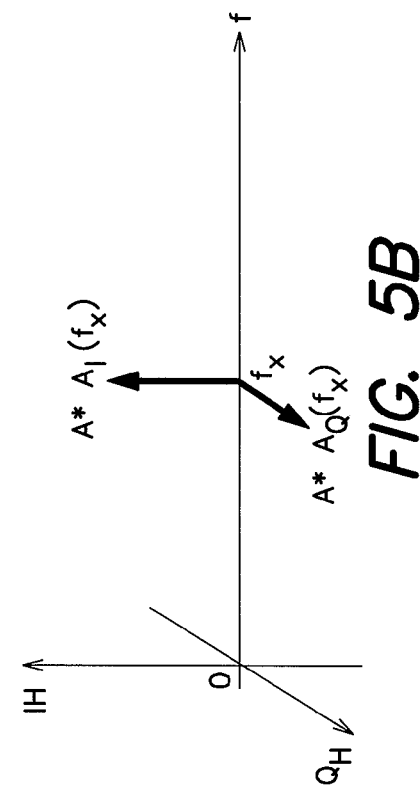
FIGS. 5A and 5B illustrates Hilbert filtering of a spectral line, selected as an example, of an I component and a Q component using a Hilbert filter pair with Hilbert filters in the I and Q signal paths, a) I and Q components, and b) I and Q components after Hilbert filtering.
Figure 5B:
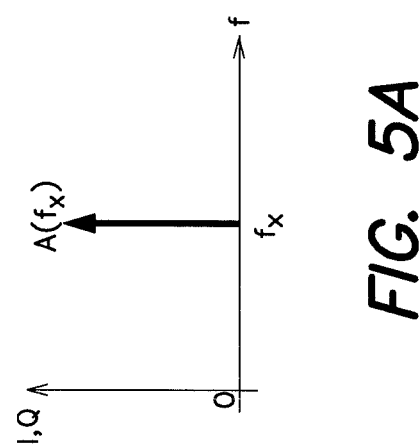

A sinusoidal input signal with a signal amplitude A and frequency $f_x$, as in FIG. 5A, is transformed upon filtering by the in-phase Hilbert filter HF-I into a sinusoidal signal of signal amplitude A*$A_I(f_x)$, and upon filtering by the quadrature Hilbert filter HF-Q is transformed into a signal shifted 90° in phase of amplitude A*$A_R(f_x)$ (see FIG. 5B).

If a $2^{nd}$ IF signal having the signal spectrum shown in FIG. 3 undergoes filtering by the circuit illustrated in FIG. 1, then modified signals are applied at the inputs or outputs of the individual circuit elements of FIG. 1, which signals are explained based on FIGS. 9-14 using various spectral lines selected as examples.

Figure 9:
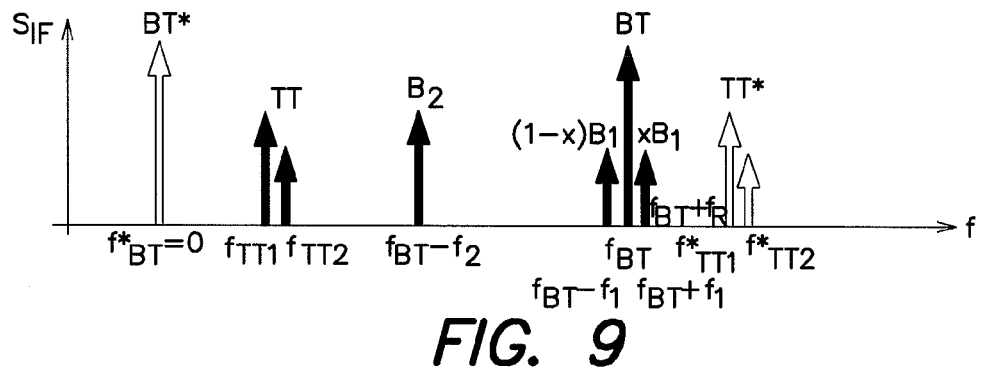
FIG. 9 illustrates a spectrum, selected as an example, of an intermediate frequency signal input to the circuit of FIG. 1.

As an example, the spectral line of video carrier BT* of the lower side channel, the intrinsic sound carrier TT, a video signal $B_2$ selected as an example in single sideband 120, a video signal $B_1$ selected as an example in double sideband 121, the intrinsic video carrier BT, and the sound carrier TT* of the upper side channel 127 are viewed as they change upon passage through the filter. The individual spectral lines are illustrated in FIG. 9 for simple reference and to elucidate the position of these spectral lines.

Figure 10:
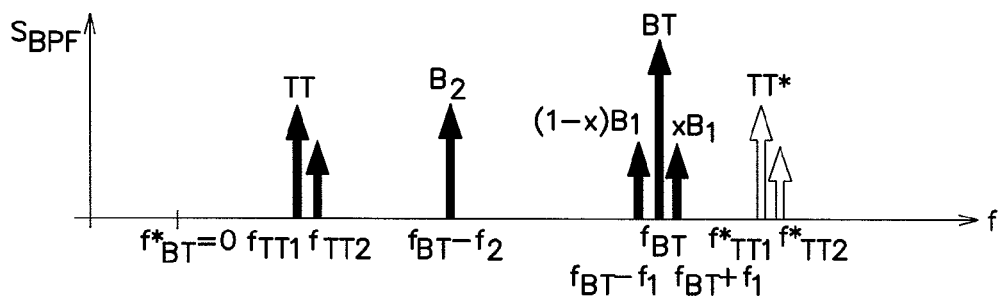
FIG. 10 illustrates the spectrum of the intermediate frequency signal fed to the input of the circuit of FIG. 1 after bandpass filtering on the input side—after bandpass filtering, the residual interference of the lower-side-channel video carrier is suppressed.
Figure 11:
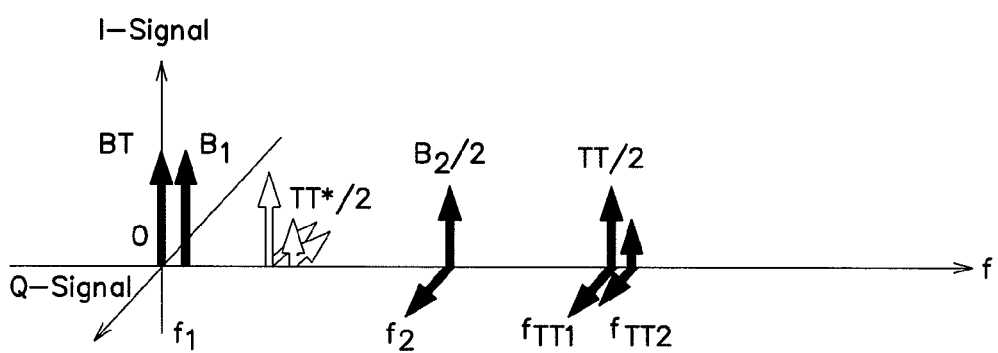
FIG. 11 illustrates spectra of the in-phase and quadrature signals after demodulation by the I/Q demodulator of FIG. 1.—after I/Q demodulation, the in-phase and quadrature signals are mixed to zero frequency—the use of mixing during the I/Q demodulation creates harmonics (not shown here) of the fundamental spectrum, the harmonics being suppressed by the low-pass filters of FIG. 1.
Figure 12:
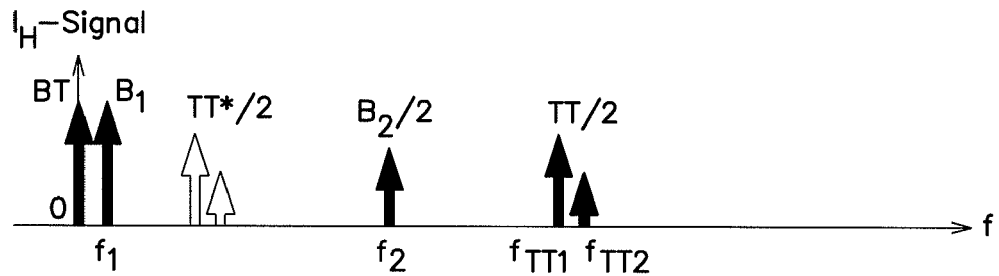
FIG. 12 illustrates the spectrum of the Hilbert-filtered in-phase signal.

The $2^{nd}$ IF signal $S_{IF}$ is provided on the line 8 to the bandpass filter 1001. The bandpass filter 1001 with a zero value at frequency f=0 and at half the sampling frequency $f_{s/2}$ has an essentially constant amplitude transition between its two zero values, and concomitantly thereto a linear phase transition. The bandpass filter is thus designed to filter out the residual interference from the lower side channel, in particular, residual interference through video carrier BT* of the lower side channel. In concrete terms, all of the above-mentioned spectral lines of FIG. 9 are passed through essentially in unchanged form—except for the video carrier signal BT* at $f_{BT*}=0$. FIG. 10 illustrates the characteristic spectral lines of FIG. 9 which remain after bandpass filtering.

In the I/Q demodulator 3, each component of the bandpass-filtered signal spectrum $S_{BPF}$ is shifted in frequency, split with rotation to the I and Q outlets $A_{3,I}$, $A_{3,Q}$, and multiplied according to the position relative to carrier frequency $f_{BT}$ with the plus or minus sign, then low-pass-filtered. The in-phase signal I now encompasses video carrier BT at frequency f=0, at a distance from video signal frequency $f_1$ video signal $B_1$ from the second sideband, at half amplitude the sound carrier signals TT* from the upper side channel, at half amplitude the video signal $B_2$ from the single sideband at video frequency $f_2$, and at half amplitude the intrinsic sound carrier signals TT. Quadrature signal Q encompasses at half amplitude the video signal from $B_2$ from the single sideband at frequency $f_2$, and the two intrinsic sound carrier signals TT at half amplitude. In addition, the residual interference of sound carrier TT* from the upper side channel is shifted by 180° in phase, and is thus also provided at half amplitude. The mixing products produced by mixing with the intrinsic video carrier frequency $f_{BT}$ around the second harmonic of video carrier BT were suppressed using low-pass filters TPF-I, TPF-Q.

The in-phase signal I is fed on the line 13 to the Hilbert filter HF-I. Since the amplitude response of the Hilbert filter HF-I is essentially constant within the range of interest (see FIG. 8A), the in-phase signal I is passed through essentially unchanged and is applied in the form of Hilbert-filtered signal $I_H$ at the output of the Hilbert filter HF-I. The spectrum of the selected spectral lines is found in FIG. 12.

The quadrature signal Q is fed to the Hilbert filter HF-Q. As is evident from FIG. 8B, spectral lines at a frequency below residual frequency $f_R$ are suppressed. Spectral lines between residual frequency $f_R$ and a frequency corresponding to the bandwidth of video signal BB are passed through unchanged. Signal lines between this frequency BB and a frequency corresponding to channel bandwidth B are inverted.

Figure 13:
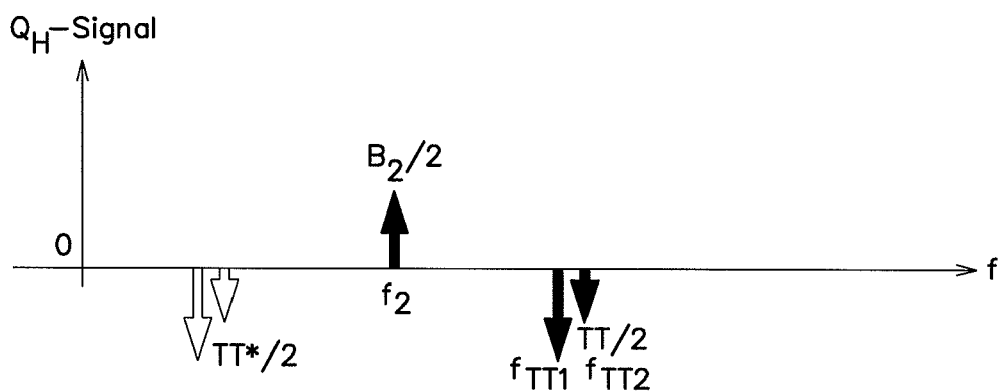
FIG. 13 illustrates the spectrum of the Hilbert-filtered quadrature signal—the Q-signal spectrum is rotated in phase by the phase angle π for higher frequencies.

FIG. 13 shows the spectrum for the selected characteristic lines of the $Q_H$ signal. Specifically, as shown in FIG. 13 no video carrier signal BT of the lower side channel is present in the Q branch, and no video signal $B_1$ is present in the Q branch of the double sideband range (vestigial sideband range). Video signal $B_2$ from the single sideband is found at a distance from frequency $f_2$. As before, this signal is present at only half the signal amplitude. Sound signal TT is inverted and has half the signal amplitude. Also inverted and at half the signal amplitude is the sound carrier signal of the upper side channel.

Figure 14:
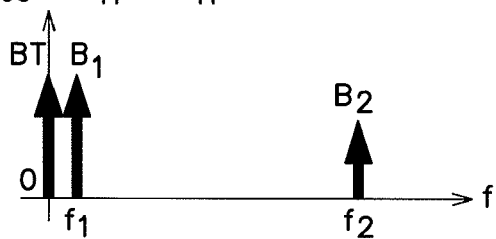
FIG. 14 illustrates the spectrum of the video output signal.

Hilbert-filtered in-phase signal $I_H$ and Hilbert-filtered quadrature signal $Q_H$ are summed by the adder 21 and output on the line 23 at output $A_{Video}$ as video signal $S_{Video}$. FIG. 14 shows the selected characteristic lines of the signal spectrum after addition of the Hilbert-filtered in-phase signal and the Hilbert-filtered quadrature signal $Q_H$. At the output $A_{Video}$, only the lines of the video signal are present here, that is, video carrier BT at zero frequency, the video signal of the double sideband $B_1$ at frequency $f_1$, and video signal $B_2$ of the single sideband at frequency at frequency $f_2$.

Figure 15:
FIG. 15 illustrates the spectrum of the sound output signal.

The subtractor 22 generates the difference between the Hilbert-filtered in-phase signal and the Hilbert-filtered quadrature signal $Q_H$. FIG. 15 shows the selected characteristic lines for the input signal spectrum of FIG. 9 after subtraction of the Hilbert-filtered quadrature signal $Q_H$ from the Hilbert filter in-phase signal $I_H$. Both the sound carrier of the intrinsic channel and the sound carrier of the upper side channel are seen. In order to eliminate the latter, the signal $S_{Sound}'$ output from the subtractor 22 on the line 24 is input to the high-pass filter 1010 in which the residual interference from the upper side channel, that is, sound carrier signal TT* of the upper side channel is suppressed. The high-pass-filtered difference signal between the Hilbert-filtered in-phase signal $I_H$ and the Hilbert-filtered quadrature signal $Q_H$ are output as signal $S_{Sound}$. Ideally, what remains as output signal $S_{Sound}$ at sound signal output $A_{Sound}$ is only the two sound carrier signals which are manifested by the two sound carrier signals TT.

Although the present invention has been illustrated and described with respect to several preferred embodiments thereof, various changes, omissions and additions to the form and detail thereof, may be made therein, without departing from the spirit and scope of the invention.

What is claimed is:

1. A method for channel filtering of an analog or digitally modulated TV signal (125), comprising:
   receiving the TV signal that includes a video signal component, a sound signal component, and a video carrier signal at a video carrier frequency;
   bandshifting the TV signal (125) to an intermediate frequency at the video carrier frequency ($f_{BT}$), generating an intermediate frequency signal ($S_{IF}$), where the intermediate frequency signal ($S_{IF}$) is I/Q-demodulated with a signal (S($f_{BT}$; 0°)) at a video carrier frequency ($f_{BT}$) into an in-phase signal (I), and with a signal (S($f_{BT}$; 90°)) shifted in phase by a phase angle π/2 relative to the signal (S($f_{BT}$; 0°)) and at a video carrier frequency ($f_{BT}$) into a quadrature signal (Q);
   filtering the in-phase signal (I) in a first Hilbert filter (HF-I) of a Hilbert filter pair (HF-I, HF-Q) having an even symmetrical impulse response ($h_1(L-n)=h_1(n)$) in order to obtain a Hilbert-filtered in-phase signal ($I_H$);
   filtering the quadrature signal (Q) in a second Hilbert filter (HF-Q) of the Hilbert filter pair (HF-I, HF-Q) having an uneven symmetrical impulse response in order to obtain a Hilbert-filtered quadrature signal ($Q_H$); and
   adding the Hilbert-filtered quadrature signal ($Q_H$) to the Hilbert-filtered in-phase signal ($I_H$) in order to obtain a video output signal ($S_{Video}$) and/or subtracting the Hilbert-filtered quadrature signal ($Q_H$) from the Hilbert-filtered in-phase signal ($I_H$) in order to obtain a sound output signal ($S_{Sound}'$).

2. The method of claim 1, where the intermediate frequency signal ($S_{IF}$) is generated by converting a video carrier (BT*) from the lower side channel to zero frequency ($f_{BT}*=0$).

3. The method of claim 1, where the intermediate frequency signal ($S_{IF}$) is bandpass-filtered before the I/Q demodulation.

4. The method of claim 3, where the bandpass filtering is implemented digitally at a sampling frequency ($f_s$).

5. The method of claim 3, where the bandpass filtering is used to suppress residual interference ($f_{BT}*$) from the lower side channel.

6. The method of claim 5, where the bandpass filtering has a passband that extends between a frequency greater than the frequency to which the video carrier (BT*) of the lower side channel has been converted and a frequency smaller than half the sampling frequency.

7. The method of claim 5, where the bandpass filtering has a zero value at the frequency * to which the video carrier (BT*) of the lower side channel has been converted, and/or that the bandpass filtering has a zero value at half the sampling frequency.

8. The method of claim 1, where the in-phase signal (I) is low-pass-filtered before the Hilbert filtering and/or that the quadrature signal (Q) is low-pass-filtered before the Hilbert filtering.

9. The method of claim 8, where the low-pass filtering of the in-phase signal (I) and/or the low-pass filtering of the quadrature signal (Q) is used to suppress unwanted mixing products around the second harmonic of the video carrier ($f_{BT}$) from the I/Q demodulation.

10. The method of claim 9, where the low-pass filtering of the in-phase signal (I) has a passband that extends up to a frequency corresponding to a channel bandwidth of the TV signal, and/or that the low-pass filtering of the quadrature signal (Q) has a passband that extends up to a frequency corresponding to a channel bandwidth (B) of the TV signal.

11. The method of claim 9, where the low-pass filtering of the in-phase signal (I) has a zero value at a frequency corresponding to double the video carrier frequency ($2f_{BT}$) minus the channel bandwidth.

12. The method of claim 1, where the Hilbert filtering is used to suppress interference products from an upper side channel, and/or that the phase relationship, in particular, the sign of the video signal and sound signal components in the in-phase signal (I) and quadrature signal (Q), are synchronized so as to produce the separation into the video output signal ($S_{Video}$) and the sound output signal ($S_{Sound}$) based on the sum of the Hilbert-filtered in-phase signal ($I_H$) and Hilbert-filtered quadrature signal ($Q_H$), or on the difference taken between the Hilbert-filtered in-phase signal ($I_H$) and Hilbert-filtered quadrature signal ($Q_H$).

13. The method of claim 12, where the Hilbert filtering of the in-phase signal (I) has a passband that extends up to an upper frequency corresponding to the channel bandwidth, and/or that the Hilbert filtering of the quadrature signal (Q) has a passband that extends up to an upper frequency corresponding to the channel bandwidth (B).

14. The method of claim 12, where the Hilbert filtering of the quadrature signal (Q) has a passband that extends up to a lower frequency corresponding to a residual bandwidth ($F_R$).

15. The method of claim 14, where the Hilbert filtering of the quadrature signal (Q) between a frequency corresponding to a bandwidth of the video signal and a frequency corresponding to a channel bandwidth has a transfer function ($H_Q=-A_Q$) with the sign inverted, as compared with the transfer function ($H_Q=A_Q$) between the residual frequency and a frequency corresponding to a bandwidth of the video signal.

16. The method of claim 12, where the Hilbert filtering of the in-phase signal (I) has a zero value at a frequency corresponding to double the video carrier frequency minus the channel bandwidth, and/or the Hilbert filtering of the quadrature signal (Q) has a zero value at a frequency corresponding to double the video carrier frequency minus the channel bandwidth, and/or that the Hilbert filtering of the quadrature signal (Q) has a zero value at a frequency corresponding to a bandwidth (BB) of the video signal.

17. The method of claim 1, where the sound signal ($S_{Sound}'$) is high-pass-filtered in order to obtain a filtered sound output signal ($S_{Sound}$).

18. The method of claim 17, where the high-pass filtering suppresses residual interference from a lower side channel.

19. A circuit for channel filtering of an analog or digitally modulated TV signal (125), comprising a video signal (125b), a sound signal (125a), and a video carrier signal (BT) having a video carrier frequency ($f_{BT}$) at which the TV signal (125) is converted to an intermediate frequency ($2^{nd}$ IF), generating an intermediate frequency signal ($S_{IF}$), where an I/Q demodulator (3) is provided which is designed to demodulate the intermediate frequency ($S_{IF}$) with a signal ($S(f_{BT}; 0°)$) at a video carrier frequency ($f_{BT}$) into an in-phase signal (I), and with a signal ($S(f_{BT}; 90°)$) shifted in phase by a phase angle π/2 relative to the signal ($S(f_{BT}; 0°)$) and at a video carrier frequency ($f_{BT}$) into a quadrature signal (Q); that a Hilbert filter pair (HF-I, HF-Q) is provided with a first Hilbert filter (HF-I) having a first even symmetrical impulse response ($h_1(L-n)=h_1(n)$) and a second Hilbert filter (HF-Q) having a second uneven symmetrical response ($h_Q(L-n)=-h_Q(n)$); wherein the first Hilbert filter (HF-I) is designed to filter the in-phase signal (I) in order to obtain a Hilbert-filtered in-phase signal ($I_H$); and whereby the second Hilbert filter (HF-Q) is designed to filter the quadrature signal (Q) in order to obtain a Hilbert-filtered quadrature signal ($Q_H$); that an adder (21) is provided which is designed to add the Hilbert-filtered quadrature signal ($Q_H$) to the Hilbert-filtered in-phase signal ($I_H$) in order to obtain a video output signal ($S_{Video}$); and/or that a subtractor (22) is provided which is designed to subtract the Hilbert-filtered quadrature signal ($Q_H$) from the Hilbert-filtered in-phase signal ($I_H$) in order to obtain a sound output signal ($S_{Sound}'$).

20. The circuit of claim 19, comprising means for generating the intermediate frequency ($S_{IF}$) by converting a video carrier (BT*) from a lower side channel (126, 126') to zero frequency ($f_{BT}*=0$).

21. The circuit of claim 19, comprising a bandpass filter (BPF) connected on the input side of the I/Q demodulator (3) to bandpass-filter the intermediate frequency signal ($S_{IF}$) before the I/Q demodulation.

22. The circuit of claim 21, where the bandpass filter (BPF) bandpass filters digitally at a sampling frequency ($f_s$).

23. The circuit of claim 21, where the bandpass filter (BPF) suppresses residual interference ($f_{BT}*$) from the lower side channel (126').

24. The circuit of claim 23, where the bandpass filter (BPF) has a passband (135) that extends between a frequency (f) that is greater than the frequency ($f_{BT}*=0$; 133) to which the video carrier (BT*) of the lower side channel (126') has been converted and a frequency (f) that is smaller than half the sampling frequency ($f_s/2$; 134).

25. The circuit of claim 23, where the bandpass filter (BPF) has a zero value (133) at the frequency ($f_{BT}*=0$) to which the video carrier (BT*) of the lower side channel (126') has been converted, and/or that the bandpass filter (BPF) has a zero value (134) at half the sampling frequency.

26. The circuit of claim 19, further comprising at least one of a low-pass filter (TPF-I) that filters the in-phase signal (I) before the Hilbert filtering and a low-pass filter (TPF-Q) that filters the quadrature signal (Q) before the Hilbert filtering.

27. The circuit of claim 26, where the low-pass filter (TPF-I) attenuates mixing products around the second harmonic of the video carrier ($f_{BT}$) from the I/Q demodulation.

28. The circuit of claim 27, where the low-pass filter (TPF-I) has a passband (136) that extends up to a frequency (f) corresponding to a channel bandwidth (B) of the TV signal, and/or that the low-pass filter (TPF-Q) for the quadrature signal (Q) has a passband (136) that extends up to a frequency (f) corresponding to a channel bandwidth (B) of the TV signal.

29. The circuit of claim 27, where the low-pass filter (TPF-I) for the in-phase signal (I) has a zero value (139) at a frequency ($2f_{BT}$–B) corresponding to double the video carrier frequency ($2f_{BT}$) minus the channel bandwidth (B).

30. The circuit of claim 19, where the Hilbert filter pair (HF-I, HF-Q) suppresses interference products from an upper side channel (127'), and/or that the Hilbert filter pair (HF-I, HF-Q) is designed to synchronize the phase relationship, in particular, the sign, of video signal and sound signal components in the in-phase signal (I) and in the quadrature signal (Q) so as to produce the separation into the video output signal ($S_{Video}$) and the sound output signal ($S_{Sound}$) based on the sum of the Hilbert-filtered in-phase signal ($I_H$) and Hilbert-filtered quadrature signal ($Q_H$), or on the difference taken between the Hilbert-filtered in-phase signal ($I_H$) and Hilbert-filtered quadrature signal ($Q_H$).

31. The circuit of claim 30, where the Hilbert filter (HF-I) for the in-phase signal (I) has a passband (137) that extends up to an upper frequency (f) corresponding to the channel bandwidth (B), and/or that the Hilbert filter (HF-Q) for the quadrature signal (Q) has a passband (138a, 138b) that extends up to an upper frequency (f) corresponding to the channel bandwidth (B).

32. The circuit of claim 30, where the Hilbert filter (HF-Q) for the quadrature signal (Q) has a passband (138a, 138b) that extends up to a lower frequency (f) corresponding to a residual frequency ($f_R$).

33. The circuit of claim 32, where the Hilbert filter (HF-Q) for the quadrature signal (Q) between a frequency corresponding to a bandwidth (BB) of the video signal and a frequency corresponding to channel bandwidth (B) has a transfer function ($H_Q$=–$A_Q$) with the sign inverted, as compared with the transfer function ($H_Q$=$A_Q$) between the residual frequency ($f_R$) and a frequency corresponding to a bandwidth (BB) of the video signal.

34. The circuit of claim 30, where the Hilbert filter (HF-I) for the in-phase signal (I) has a zero value (139) at a frequency ($2f_{BT}$–B) corresponding to double the video carrier frequency ($2f_{BT}$) minus the channel bandwidth (B), and/or that the Hilbert filter (HF-Q) for the quadrature signal (Q) has a zero value (139) at a frequency ($2f_{BT}$–B) corresponding to double the video carrier frequency ($2f_{BT}$) minus the channel bandwidth (B), and/or that the Hilbert filter (HF-Q) for the quadrature signal (Q) has a zero value (139) at a frequency corresponding to a bandwidth (BB) of the video signal.

35. The circuit of claim 19, further comprising a high-pass filter (HPF) to high-pass-filter the sound output signal ($S_{Sound}'$) in order to obtain a filtered sound output signal ($S_{Sound}$).

36. The circuit of claim 35, where the high-pass filter (HPF) suppresses residual interference (TT*) from a lower side channel (126').

\* \* \* \* \*

UNITED STATES PATENT AND TRADEMARK OFFICE
CERTIFICATE OF CORRECTION

PATENT NO. : 7,593,065 B2  
APPLICATION NO. : 11/274901  
DATED : September 22, 2009  
INVENTOR(S) : Temerinac et al.

Page 1 of 1

It is certified that error appears in the above-identified patent and that said Letters Patent is hereby corrected as shown below:

<u>Column 1</u>  
Line 39, delete "Modem" and insert --Modern--

<u>Column 11</u>  
In the claims, claim 7, line 7, delete "*"

Signed and Sealed this

Twenty-seventh Day of October, 2009

David J. Kappos  
*Director of the United States Patent and Trademark Office*